US012120727B2

(12) United States Patent
Chin et al.

(10) Patent No.: US 12,120,727 B2
(45) Date of Patent: Oct. 15, 2024

(54) METHOD AND APPARATUS FOR OPERATING CONFIGURED GRANT TIMERS IN WIRELESS COMMUNICATION SYSTEM

(71) Applicant: FG Innovation Company Limited, Tuen Mun (HK)

(72) Inventors: Heng-Li Chin, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 408 days.

(21) Appl. No.: 17/599,728

(22) PCT Filed: Apr. 1, 2020

(86) PCT No.: PCT/CN2020/082836
§ 371 (c)(1),
(2) Date: Sep. 29, 2021

(87) PCT Pub. No.: WO2020/200251
PCT Pub. Date: Oct. 8, 2020

(65) Prior Publication Data
US 2022/0159668 A1    May 19, 2022

Related U.S. Application Data

(60) Provisional application No. 62/829,210, filed on Apr. 4, 2019.

(51) Int. Cl.
*H04W 72/56* (2023.01)
*H04L 1/00* (2006.01)
(Continued)

(52) U.S. Cl.
CPC ........... *H04W 72/56* (2023.01); *H04L 1/0003* (2013.01); *H04L 1/1812* (2013.01); *H04W 72/0446* (2013.01); *H04W 72/23* (2023.01)

(58) Field of Classification Search
CPC . H04W 72/56; H04W 72/0446; H04W 72/23; H04L 1/0003; H04L 1/1812; H04L 1/1822; H04L 1/1887
See application file for complete search history.

(56) References Cited

U.S. PATENT DOCUMENTS

2019/0097765 A1    3/2019  Jose et al.
2019/0253197 A1*   8/2019  Babaei .................... H04L 1/188
(Continued)

FOREIGN PATENT DOCUMENTS

WO    WO-2014153688 A1 * 10/2014 ........... H04L 1/1854
WO    2018/232321 A2     12/2018

OTHER PUBLICATIONS

CATT, UE behavior on configured grant timer upon DCI reception, 3GPP TSG-RAN WG2 NR AH-1801, R2-1800165, entire pages. (Year: 2018).*
(Continued)

*Primary Examiner* — Ayaz R Sheikh
*Assistant Examiner* — Mang Boi Thawng
(74) *Attorney, Agent, or Firm* — ScienBiziP, P.C.

(57) ABSTRACT

A method performed by a UE for wireless communications is provided. The method includes determining whether a first HARQ process of a first PUSCH duration of a first configured uplink grant is occupied by a dynamic uplink grant indicating a second PUSCH duration, and in a case that the first HARQ process of the first PUSCH duration is occupied by the dynamic uplink grant indicating the second PUSCH duration, determining whether the first PUSCH duration is prioritized over the second PUSCH duration based on a set of rules for determining priorities for the first PUSCH duration and the second PUSCH duration, and when the first PUSCH duration is prioritized over the second PUSCH duration, performing transmission on the first PUSCH duration, and starting or restarting a first configured grant timer
(Continued)

corresponding to the first HARQ process of the first PUSCH duration during the first PUSCH duration.

14 Claims, 9 Drawing Sheets

(51) Int. Cl.
    *H04L 1/1812*     (2023.01)
    *H04W 72/0446*     (2023.01)
    *H04W 72/23*     (2023.01)

(56) References Cited

U.S. PATENT DOCUMENTS

| | | | | |
|---|---|---|---|---|
| 2019/0327755 | A1* | 10/2019 | Xiong | H04L 5/0046 |
| 2020/0146045 | A1* | 5/2020 | Loehr | H04L 1/1812 |
| 2021/0021385 | A1* | 1/2021 | Chen | H04L 1/1854 |
| 2021/0314955 | A1* | 10/2021 | Zhang | H04W 72/02 |
| 2021/0352699 | A1* | 11/2021 | Lin | H04L 5/0057 |
| 2022/0217760 | A1* | 7/2022 | Iyer | H04L 5/0053 |
| 2022/0369362 | A1* | 11/2022 | Goto | H04W 72/1263 |

OTHER PUBLICATIONS

Vivo, Collision between dynamic grant and configured grant , 3GPP TSG-RAN WG2 NR Ad hoc 1801, R2-1800902, entire pages. (Year: 2018).*

3GPP TSG RAN WG1 Meeting #94bis, NTT DOCOMO, Inc. "Maintenance for physical uplink control channel", R1-1811374 (Year: 2018).*

3GPP TS 38.214, "3rd Generation Partnership Project; Technical Specification Group Radio Access Network; NR; Physical layer procedures for data (Release 15)", V15.3.0 (Sep. 2018).

3GPP TS 38.321, "3rd Generation Partnership Project; Technical Specification Group Radio Access Network; NR; Medium Access Control (MAC) protocol specification (Release 15)", V15.4.0 (Dec. 2018).

LG Electronics, "Discussion on resource conflict between PUSCHs", R1-1904633, 3GPP TSG RAN WG1 #96 Athens, Greece, Feb. 25-Mar. 1, 2019.

Nokia et al., "Motivation for WI on support of NR Industrial Internet of Things (IoT)", RP-190191, 3GPP TSG RAN Meeting 83, Shenzhen, China, Mar. 18-21, 2019.

Nokia et al., "New WID: Support of NR Industrial Internet of Things (IoT)", RP-190190, 3GPP TSG RAN Meeting #83, Shenzhen, China, Mar. 18-21, 2019.

* cited by examiner

METHOD AND APPARATUS FOR OPERATING CONFIGURED GRANT TIMERS IN WIRELESS COMMUNICATION SYSTEM

CROSS-REFERENCE TO RELATED APPLICATION(S)

The present application is the National Stage Application of International Patent Application Ser. No. PCT/CN2020/082836, filed on Apr. 1, 2020, entitled "METHOD AND APPARATUS FOR OPERATING CONFIGURED GRANT TIMERS IN WIRELESS COMMUNICATION SYSTEM," which claims the benefit of and priority to U.S. Provisional Patent Application Ser. No. 62/829,210, filed on Apr. 4, 2019, entitled "Operation of Configured Grant Timer in the Presence of Intra-UE Uplink Prioritization," with the entire contents of all of which are hereby incorporated fully by reference into the present application.

FIELD

The present disclosure generally relates to wireless communications, and more particularly, to methods and apparatuses for operating configured grant timers in a wireless communication system.

BACKGROUND

With the tremendous growth in the number of connected devices and the rapid increase in user/network traffic volume, various efforts have been made to improve different aspects of wireless communication for the next generation wireless communication system, such as the fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is directed to methods and apparatuses for operating configured grant timers in a wireless communication system.

According to an aspect of the present disclosure, a User Equipment (UE) is provided. The UE includes one or more non-transitory computer-readable media having computer-executable instructions embodied thereon and at least one processor coupled to the one or more non-transitory computer-readable media. The at least one processor is configured to execute the computer-executable instructions to determine whether a first Hybrid Automatic Repeat Request (HARQ) process of a first Physical Uplink Shared Channel (PUSCH) duration of a first configured uplink grant is occupied by a Dynamic Uplink Grant indicating a second PUSCH duration, and in a case that the first HARQ process of the first PUSCH duration is occupied by the dynamic uplink grant indicating the second PUSCH duration, determine whether the first PUSCH duration is prioritized over the second PUSCH duration based on a set of rules for determining priorities for the first PUSCH duration and the second PUSCH duration, and when the first PUSCH duration is prioritized over the second PUSCH duration, perform transmission on the first PUSCH duration, and start or restart a first configured grant timer corresponding to the first HARQ process of the first PUSCH duration during the first PUSCH duration.

According to another aspect of the present disclosure, a method performed by a UE for wireless communications is provided. The method includes determining whether a first HARQ process of a first PUSCH duration of a first configured uplink grant is occupied by a dynamic uplink grant indicating a second PUSCH duration, and in a case that the first HARQ process of the first PUSCH duration is occupied by the dynamic uplink grant indicating the second PUSCH duration, determining whether the first PUSCH duration is prioritized over the second PUSCH duration based on a set of rules for determining priorities for the first PUSCH duration and the second PUSCH duration, and when the first PUSCH duration is prioritized over the second PUSCH duration, performing transmission on the first PUSCH duration, and starting or restarting a first configured grant timer corresponding to the first HARQ process of the first PUSCH duration during the first PUSCH duration.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
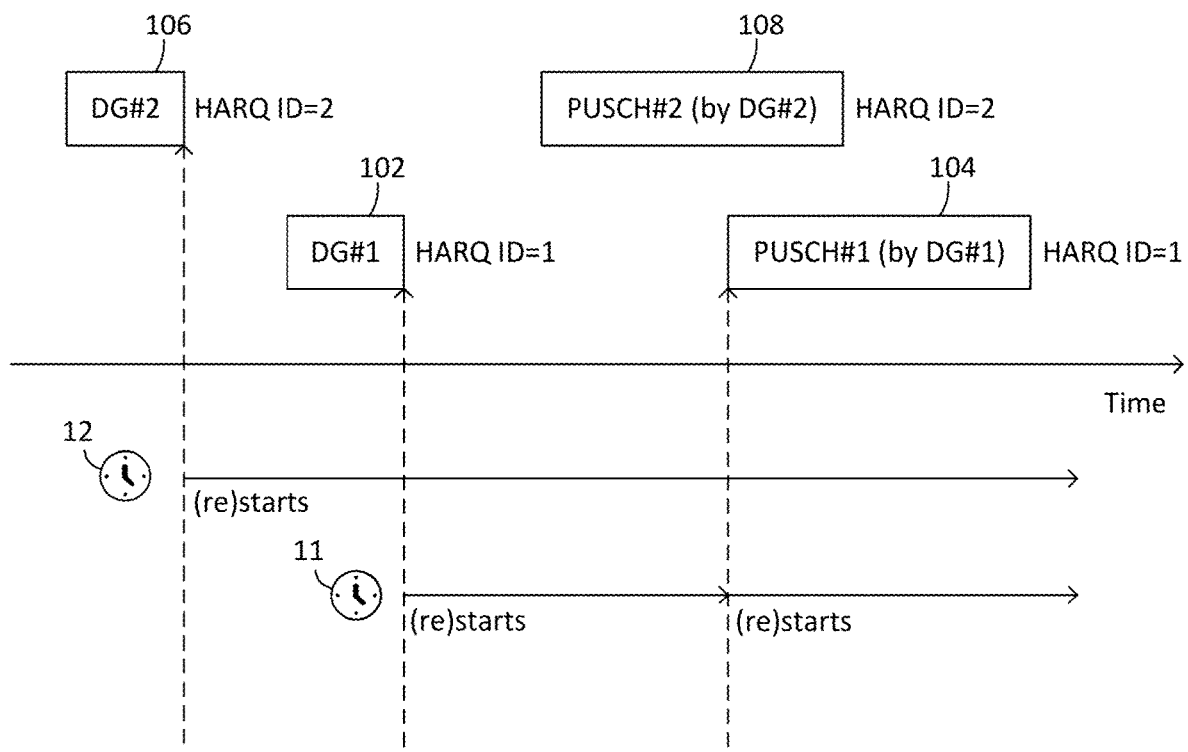
FIG. 1 is a schematic diagram illustrating a conflict between two PUSCH durations indicated by Dynamic Uplink Grants (DGs), in accordance with an example implementation of the present application.

The following description contains specific information pertaining to example implementations in the present disclosure. The drawings in the present disclosure and their accompanying detailed descriptions are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one Base Station (BS), at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS may be operable to provide radio coverage to a specific geographical area using a plurality of cells included in the RAN. The BS supports the operations of the cells. Each cell may be operable to provide services to at least one UE within its radio coverage. More specifically, each cell (often referred to as a serving cell) may provide services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as eMBB, mMTC, URLLC, while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

The 3GPP Release 15 (Rel-15) Medium Access Control (MAC) specification neither handles the conflict between two or more PUSCH durations indicated by two or more DGs, nor handles the conflict between two or more PUSCH durations that correspond to two or more activated CGs. Moreover, based on the 3GPP Rel-15 MAC specification, a PUSCH duration indicated by a DG is always prioritized over a PUSCH duration of an activated CG when such a conflict occurs. However, if intra-UE prioritization is applied, different intra-UE uplink prioritization rules may be adopted for different conflict cases in order to select the most suitable PUSCH duration out of all conflicting PUSCH durations for data transmission. It should be noted that the terms "PUSCH duration" and "PUSCH resource" can be utilized interchangeably in the present disclosure without different meaning.

Generally, a configured grant timer may be configured per HARQ process (e.g., included in, or defined by, the configuredGrantTimer Information Element (IE). Furthermore, configuredGrantTimer IE may be included in the ConfiguredGrantConfig IE). Moreover, a configured grant timer may be started or restarted by the UE when a DG is received for Configured Scheduling-Radio Network Temporary Identifier (CS-RNTI)/Cell-RNTI (C-RNTI) for a (re-)transmission for this HARQ process, and the configured grant timer may be started or restarted upon actual PUSCH transmission. Before the expiration of the configured grant timer, this HARQ process for new transmission on the configured uplink grant (e.g., on the PUSCH duration that corresponds to a configured uplink grant) may be prohibited in order to enable the network to schedule possible retransmissions of this HARQ process (e.g., schedules a PUSCH duration for a UE to perform retransmission of this HARQ process). However, the functionality of the configured grant timer may be affected as a result of intra-UE uplink prioritization.

1. Handling Unsynchronized Configured Grant Timer Behavior Between UE Side and Network Side According to the 3GPP Rel-15 MAC specification, the configured grant timer of a HARQ process, if configured, may be started or restarted by the MAC entity after either one of the following cases:

When a DG of the HARQ process is received on a Physical Downlink Control Channel (PDCCH) for the MAC entity's C-RNTI; and When a DG of the HARQ process is received on a PDCCH for the MAC entity's CS-RNTI for retransmission (e.g., the New Data Indicator (NDI) in the received HARQ information in the DG, received by the MAC entity, indicates a value of "1".

Furthermore, according to Rel-15 MAC specification, the configured grant timer of a HARQ process, if configured, may be started or restarted by the HARQ entity upon either one of the following cases:

When the MAC entity/HARQ entity/HARQ process has performed a new transmission on a PUSCH duration of an activated CG for this HARQ process;

When the MAC entity/HARQ entity/HARQ process has performed a new transmission on a PUSCH duration indicated by a DG for this HARQ process (e.g., DG of this HARQ process addressed to C-RNTI or CS-RNTI);

When the MAC entity/HARQ entity/HARQ process has performed a new transmission on a PUSCH duration indicated by a RAR for this HARQ process;

When the MAC entity/HARQ entity/HARQ process has performed a retransmission on a PUSCH duration indicated by a DG for this HARQ process (e.g., DG of this HARQ process addressed to C-RNTI, temporary C-RNTI, or CS-RNTI); and When the HARQ entity has instructed the identified HARQ process to trigger a retransmission on a PUSCH duration of an activated CG for this HARQ process.

Furthermore, intra-UE UL prioritization may be performed by a UE due to either:

Conflict (e.g., partial/fully overlapping between two or more PUSCH durations in the time domain) between PUSCH durations indicated by more than one DGs;

Conflict (e.g., partial/fully overlapping between two or more PUSCH durations in the time domain) between a PUSCH duration indicated by a DG and a PUSCH duration of an activated CG; or Conflict (e.g., partial/fully overlapping between two or more PUSCH durations in the time domain) between PUSCH durations of more than one activated CGs.

In the case where intra-UE UL prioritization has taken place due either one of the abovementioned conflict cases, it may be important to ensure the behavior of the configured grant timer is synchronized between the UE side and the network side (e.g., the operation of the configured grant timer is the same from both the UE and the network's perspective. In another word, the configured grant timer of a HARQ process may be (re)started at the same time at both the UE and the network).

In one implementation, when considering the conflict between PUSCH durations indicated by more than one DGs, the PUSCH duration indicated by the latest received DG (on a PDCCH) may be selected for transmission. The reason is that the network can take full control of dynamic scheduling. In this sense, the network may provide a DG which indicates a PUSCH duration that overlaps the PUSCH duration of a previously scheduled DG (only) if the subsequent DG is for a more urgent traffic type. Based on this assumption, there is no ambiguity of the status of the configured grant timer (e.g., whether the timer is currently running or not) between the network and the UE even if the network does not successfully receive a MAC Protocol Data Unit (PDU)/Transport Block (TB) transmitted on the prioritized PUSCH duration. It is because the prioritization outcome is known by both the network (e.g., serving gNB) and the UE when the network provides such scheduling. Hence, the network may be aware that the configured grant timer for the HARQ process of the latest received DG (on a PDCCH) would be started by the UE during the PUSCH duration indicated by the latest DG (e.g., when transmission is performed on the PUSCH duration indicated by the latest DG).

FIG. 1 is a schematic diagram illustrating a conflict between two PUSCH durations indicated by DGs, in accordance with an example implementation of the present application. As shown in FIG. 1, PUSCH #1 duration 104 indicated by DG #1 102 overlaps PUSCH #2 duration 108 indicated by DG #2 106 in the time domain. In the implementation, to handling the conflict between PUSCH #1 duration 104 and PUSCH #2 duration 108, the network may always know that a PUSCH duration (e.g., PUSCH #1 duration 104) indicated by the later DG (e.g., DG #1 102) always have a higher priority than another PUSCH duration (e.g., PUSCH #2 duration 108) indicated by the earlier DG (e.g., DG #2 106). For example, the network may always predict that configured grant timer 11 for the HARQ process (with HARQ ID=1) of DG #1 102 may start/restart at the time when DG #1 102 is received (e.g., at/after the end of the PDCCH duration in which DG #1 102 is received) and during PUSCH #1 duration 104 (e.g., at/after the beginning of PUSCH #1 duration 104), even if the MAC PDU/TB transmitted on PUSCH #1 duration 104 is not successfully received by the network. In the implementation, the UE may also start/restart configured grant timer 12 for the HARQ process (with HARQ ID=2) of DG #2 106 when DG #2 106 is received.

It should be noted that the implementations in FIG. 1 (also in FIGS. 2, 3, 4 and 5) are shown for illustrative purposes only, and is not meant to limit the scope of the present disclosure. For example, even though configured grant timer 11 is illustrated as being started/restarted at the beginning of PUSCH #1 duration 104, starting/restarting a configured grant timer during a PUSCH duration may mean to start/restart the configured grant timer at any time point within the PUSCH duration in some implementations of the present application. Furthermore, starting/restarting a configured grant timer at the time when a DG is received (e.g., on a PDCCH) may mean to start/restart the configured grant timer at (or after) the end of the PDCCH duration in which the DG is received or during the PDCCH duration in some implementations of the present application.

In addition, a configured grant timer may have expired at any time after it is stared or restarted. For example, in some other implementations, configured grant timer 11 may expire at any time between the end of the PDCCH duration in which DG #1 102 is received and the beginning of PUSCH #1 duration 104.

In addition, a UE may restart a timer (e.g., a configured grant timer) when the timer is still running. The restarted timer may be reset to, and count from, an initial/preconfigured value.

On the other hand, a UE may start a timer (e.g., a configured grant timer) after the timer has expired. Once the timer is started, the timer may start to count from an initial/preconfigured value. The initial/preconfigured value of a configured grant timer may be indicated by the configuredGrantTimer IE.

When considering the conflict between PUSCH durations indicated by a DG and an activated CG and the conflict between PUSCH durations of two or more activated CGs, an intra-UE UL prioritization may be used to select one of the conflicting PUSCH durations. In some implementations, the intra-UE UL prioritization may be based on the priority of each Logical Channel (LCH) (the priority of each LCH may be configured by the gNB) that satisfies the Logical Channel Prioritization (LCP) mapping restrictions to the conflicting PUSCH durations and the data availability of these LCHs at the point in time where the prioritization is performed (the intra-UE UL prioritization may not be limited to be implemented as the rule addressed above). Hence, the intra-UE UL prioritization may be performed internally by the UE.

In some implementations, the UE may select/prioritize a PUSCH duration with the highest priority among priorities of the LCHs with data available that are multiplexed or can be multiplexed in the MAC PDUs associated to the PUSCH durations that are conflicting (e.g., the PUSCH durations that overlap in the time domain). The configured grant timer corresponding to the HARQ process of the prioritized/selected PUSCH duration may be (re)started during the prioritized/selected PUSCH duration (e.g., when transmission of a MAC PDU/TB on the prioritized/selected PUSCH duration is performed).

However, since the intra-UE UL prioritization is done internally in the UE, the network may only know the prioritization outcome and the configured grant timer behavior of the UE upon reception of the MAC PDU/TB transmitted during the selected/prioritized PUSCH duration (e.g., after intra-UE UL prioritization). Therefore, an unsynchronized configured grant timer behavior could occur between the network and the UE if the network does not successfully receive the MAC PDU/TB transmitted on the prioritized PUSCH duration.

Figure 2:
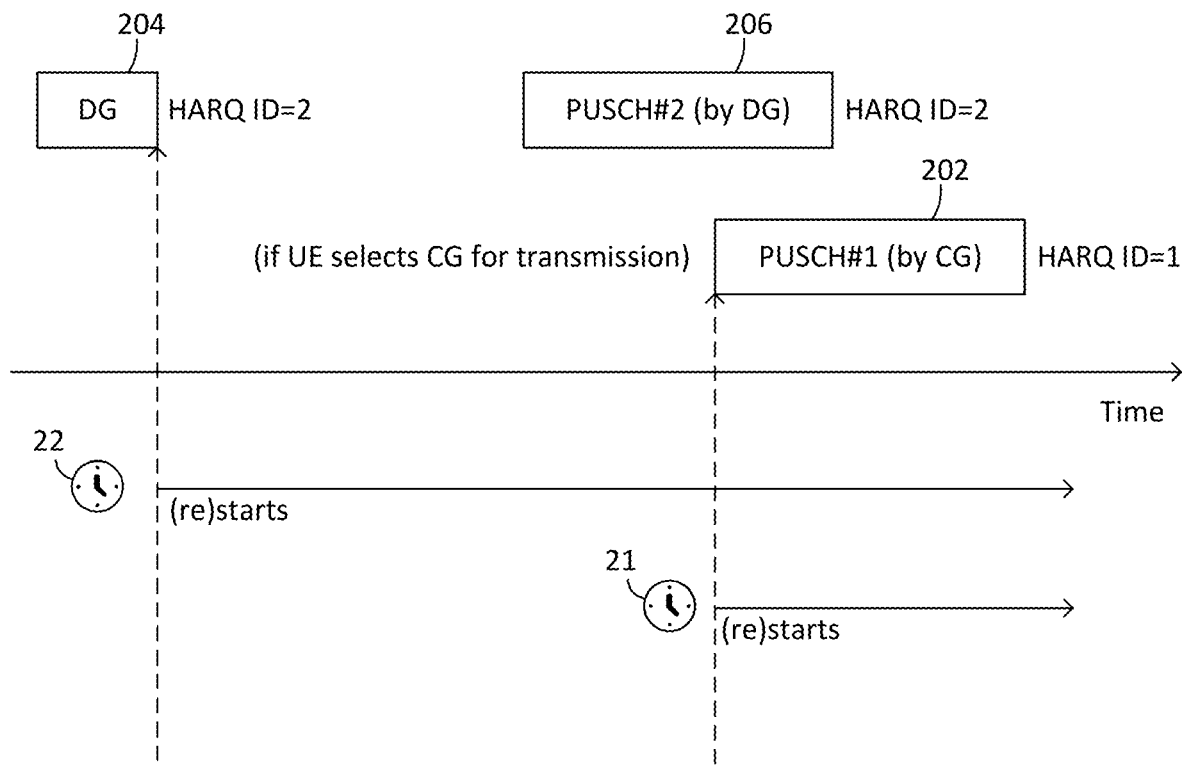
FIG. 2 is a schematic diagram illustrating a conflict between a PUSCH duration indicated by a DG and a PUSCH duration of an activated Configured Uplink Grant (CG), in accordance with an example implementation of the present application.

FIG. 2 is a schematic diagram illustrating a conflict between a PUSCH duration indicated by a DG and a PUSCH duration of an activated CG, in accordance with an example implementation of the present application. FIG. 2 represents the configured grant timer behavior from a UE's perspective. In the implementation, the PUSCH duration (e.g., PUSCH #1 duration 202) corresponding to the (activated) CG overlaps the PUSCH duration (e.g., PUSCH #2 duration 206) indicated by the DG (e.g., DG 204) in the time domain. If PUSCH #1 duration 202 is prioritized over PUSCH #2 duration 206, as a result of intra-UE UL prioritization, configured grant timer 21 for the HARQ process (e.g., with HARQ ID=1) of PUSCH #1 duration 202 may be started/restarted by the UE during PUSCH #1 duration 202 (e.g., at/after the beginning of PUSCH #1 duration 202).

However, since such intra-UE UL prioritization is done internally by the UE, the prioritization outcome may be not known by the network until the TB/MAC PDU transmitted on the prioritized PUSCH duration (e.g., PUSCH #1 duration 202) is received by the network. If the MAC PDU/TB transmitted on the prioritized PUSCH duration is not successfully received by the network, the network may not know the prioritization outcome (e.g., on which PUSCH duration the UE is selected to transmit the TB/MAC PDU).

This may lead to an unsynchronized configured grant timer behavior between the network and the UE if the network mistakenly interprets that the PUSCH duration indicated by the DG is prioritized by the UE. This is because the network may mistakenly interpret that configured grant timer (e.g., configured grant timer 22) for the HARQ process (e.g., with HARQ ID=2) of the DG (e.g., DG 204) is started/restarted at the beginning of the PUSCH duration corresponding to the DG, which is actually not the behavior at the UE side. As shown in FIG. 2, the UE may merely start/restart configured grant timer 22 for the HARQ process of DG 204 when DG 204 is received.

Methods proposed in Approach 1 may be adopted to resolve the unsynchronized configured grant timer behavior between the network and the UE when either conflict occurs between PUSCH durations indicated by a DGs and an activated CG or conflict occurs between PUSCH durations of two or more activated CGs. It should be noted that in the present disclosure, the (resource) conflict between multiple PUSCH durations may refer to fully- or partially-overlapping of two or more PUSCH durations in the time domain (these PUSCH durations may belong to the same BWP). Another type of conflict may be referred to as HARQ ID conflict, where a later PUSCH duration with the same HARQ ID as that of an earlier PUSCH duration becomes available for transmission while the configured grant timer for the HARQ process corresponding to the earlier PUSCH durations is still running.

Approach 1

In Approach 1, all configured grant timers corresponding to the HARQ processes of the conflicting PUSCH durations may be started/restarted by the UE, regardless of which PUSCH duration is selected for transmission after intra-UE UL prioritization.

For example, the MAC entity/HARQ entity (e.g., the HARQ entity within the MAC entity) of a UE may, upon reception of a DG for new transmission, check whether the PUSCH duration indicated by the received DG conflicts with a PUSCH duration of an activated CG, and check whether the configured grant timer for the HARQ process of the PUSCH duration that corresponds to the activated CG is not running. If both conditions are satisfied, the MAC entity (or HARQ entity) may start/restart the configured grant timer for the HARQ process of the DG during the PUSCH duration indicated by the DG (e.g., at/after the beginning of the PUSCH duration indicated by the DG) and start/restart the configured grant timer for the HARQ process of the PUSCH duration which corresponds to the CG during this PUSCH duration (e.g., at/after the beginning of this PUSCH duration). Then, the status of the configured grant timer may be synchronized between the UE side and the network side. In this example, the PUSCH duration of an activated CG may be either a PUSCH duration of an activated CG for new transmission or a PUSCH duration of an activated CG for retransmission. In some implementations, a PUSCH duration of an activated CG for new transmission may be, but is not limited to, one of the following two options:

Option 1. If the uplink grant is part of a bundle of the CG (e.g., When the ConfiguredGrantConfig IE the PUSCH duration corresponds to is configured with repK>1. When the MAC entity is configured with repK>1, the parameter repK provides the number of transmissions of a TB within a bundle of the CG. After the initial transmission, HARQ retransmissions follow within a bundle), and may be used for initial transmission (e.g., the redundancy version of this PUSCH duration is 0), and if no MAC PDU has been obtained for this bundle.

Option 2. If this PUSCH duration corresponds to a CG that is configured with repK of 1 (e.g., When the ConfiguredGrantConfig IE that this PUSCH duration corresponds to is configured with repK=1).

On the other hand, a PUSCH duration of an activated CG for retransmission may be, but is not limited to, one of the following three options:

Option 1. If the uplink grant is part of a bundle of the CG (e.g., When the MAC entity is configured with repK>1) and may not be used for initial transmission (e.g., the redundancy version of this PUSCH duration is not 0).

Option 2. If the uplink grant is part of a bundle of the CG (e.g., When the MAC entity is configured with repK>1), and may be used for initial transmission (e.g., the redundancy version of this PUSCH duration is 0), and if a MAC PDU has been obtained for this bundle.

Option 3. If the uplink grant received on PDCCH was addressed to CS-RNTI and if the HARQ buffer of the identified process is not empty.

Figure 3:
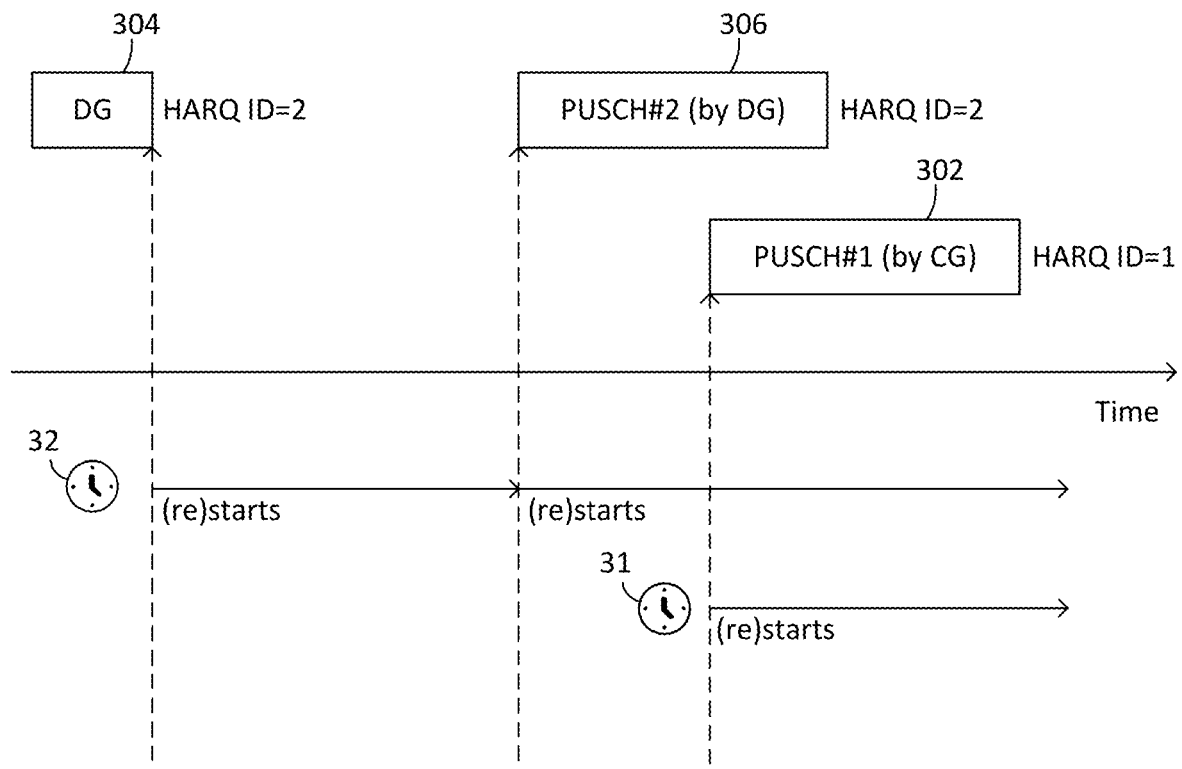
FIG. 3 is a schematic diagram illustrating a conflict between a PUSCH duration corresponding to an activated CG and a PUSCH duration indicated by a DG, in accordance with an example implementation of the present application.

An example which adopts the mechanism in Approach 1 is shown in FIG. 3. FIG. 3 is a schematic diagram illustrating a conflict between a PUSCH duration corresponding to an activated CG and a PUSCH duration indicated by a DG, in accordance with an example implementation of the present application.

As shown in FIG. 3, the PUSCH duration (e.g., PUSCH #1 duration 302) corresponding to (or determined by) the activated CG overlaps the PUSCH duration (e.g., PUSCH #2 duration 306) indicated by the DG (e.g., DG 304) in the time domain. In addition, the UE may start/restart configured grant timer 32 for the HARQ process (e.g., with HARQ ID=2) of DG 304 when DG 304 is received (e.g., at/after the end of the PDCCH on which DG 304 is received). To avoid the unsynchronized configured grant timer behavior between the network and the UE (e.g., the network does not know whether the UE prioritizes PUSCH #1 duration 302 or PUSCH #2 duration 306 until receiving the prioritized PUSCH duration), the MAC entity/HARQ entity of the UE may start/restart configured grant timer 32 for the HARQ process for PUSCH #2 duration 306 during PUSCH #2 duration 306 (e.g., at/after the beginning of PUSCH #2 duration 306) and start/restart configured grant timer 31 for the HARQ process (e.g., with HARQ ID=1) for PUSCH #1 duration 302 during PUSCH #1 duration 302 (e.g., at/after the beginning of PUSCH #1 duration 302). In another word, the configured grant timer corresponding to the HARQ processes of both conflicting PUSCH durations may be (re)started during their respective PUSCH durations, even if the UE prioritizes only one of the conflicting PUSCH durations for transmission.

Figure 4:
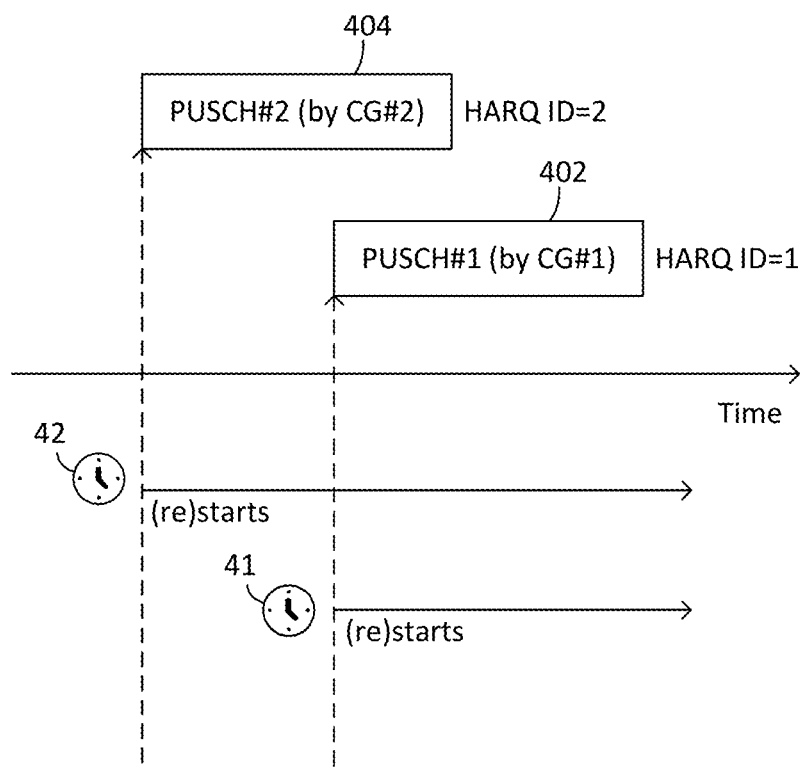
FIG. 4 is a schematic diagram illustrating a conflict between two PUSCH durations both corresponding to CGs, in accordance with an example implementation of the present application.

Another example which adopts the mechanism in Approach 1 is shown in FIG. 4. FIG. 4 is a schematic diagram illustrating a conflict between two PUSCH durations both corresponding to CGs, in accordance with an example implementation of the present application.

As shown in FIG. 4, the PUSCH duration (e.g., PUSCH #1 duration 402) corresponding to (or determined by) the CG #1 overlaps the PUSCH duration (e.g., PUSCH #2 duration 404) corresponding to (or determined by) the CG #2 in the time domain. To avoid the unsynchronized configured grant timer behavior between the network and the UE (e.g., the network does not know whether the UE prioritizes PUSCH #1 duration 402 or PUSCH #2 duration 404 until receiving the prioritized PUSCH duration), the MAC entity/HARQ entity of the UE may start/restart configured grant timer 41 for the HARQ process (e.g., with HARQ ID=1) for PUSCH #1 duration 402 during PUSCH #1 duration 402 (e.g., at/after the beginning of PUSCH #1 duration 402), and start/restart configured grant timer 42 for the HARQ process (e.g., with HARQ ID=2) for PUSCH #2 duration 404 during PUSCH #2 duration 404 (e.g., at/after the beginning of PUSCH #2 duration 404). In another word, the configured grant timer corresponding to the HARQ processes of both conflicting PUSCH durations may be (re)started during their respective PUSCH durations, even if the UE prioritizes only one of the conflicting PUSCH durations for transmission.

An example text proposal which shows the modifications to Technical Specification (TS) 38.321 v 15.4.0 for Approach 1 is shown in Table 1 and Table 2.

vated CG for new transmission, and check whether the configured grant timer for the HARQ process of the PUSCH duration that corresponds to the activated CG is not running. If both conditions are satisfied, the MAC entity/HARQ entity of the UE may start/restart the configured grant timer for the HARQ process of the DG during the PUSCH duration indicated by the DG (e.g., at the beginning of the PUSCH duration indicated by the DG) and start/restart the configured grant timer for the HARQ process of the PUSCH

TABLE 1

5.4.2 HARQ operation
5.4.2.1           HARQ entity
                For each uplink grant, the HARQ entity shall:
1>    identify the HARQ process associated with this grant, and for each identified HARQ process:
      2>   if the received grant was not addressed to a Temporary C-RNTI on PDCCH, and the NDI provided in the associated HARQ information has been toggled compared to the value in the previous transmission of this TB of this HARQ process; or
      2>   if the uplink grant was received on PDCCH for the C-RNTI and the HARQ buffer of the identified process is empty; or
      2>   if the uplink grant was received in a Random Access Response; or
      2>   if the uplink grant was received on PDCCH for the C-RNTI in ra-ResponseWindow and this PDCCH successfully completed the Random Access procedure initiated for beam failure recovery; or
      2>   if the uplink grant is part of a bundle of the configured uplink grant, and may be used for initial transmission according to subclause 6.1.2.3 of TS 38.214 [7], and if no MAC PDU has been obtained for this bundle
                          3> if the PUSCH duration indicated by the uplink grant does not overlap with the PUSCH duration indicated by another uplink grant:
            4>   if there is a MAC PDU in the Msg3 buffer and the uplink grant was received in a Random Access Response; or:
            4>   if there is a MAC PDU in the Msg3 buffer and the uplink grant was received on PDCCH for the C-RNTI in ra-ResponseWindow and this PDCCH successfully completed the Random Access procedure initiated for beam failure recovery:
                5> obtain the MAC PDU to transmit from the Msg3 buffer.
                5> if the uplink grant size does not match with size of the obtained MAC PDU; and
                5> if the Random Access procedure was successfully completed upon receiving the uplink grant:
                    6>   indicate to the Multiplexing and assembly entity to include MAC subPDU(s) carrying MAC SDU from the obtained MAC PDU in the subsequent uplink transmission;
                    6>   obtain the MAC PDU to transmit from the Multiplexing and assembly entity.
            4> else:
                5> obtain the MAC PDU to transmit from the Multiplexing and assembly entity, if any;
                  (followed by Table 2)

TABLE 2

(Continued from Table 1)
  3>   else (For example, conflict between PUSCH indicated by a DG for new transmission and any other PUSCH duration, conflict between PUSCH duration of an activated CG for new transmission and any other PUSCH duration, etc)
            4>     when PUSCH duration corresponding to the received DG for new transmission conflicts with a PUSCH duration of an activated CG for new transmission
                5> perform MAC-based prioritization (For example, based on the priority (the priority is configured by the gNB) of each LCH that satisfies the LCP mapping restrictions to the conflicting PUSCH durations and the data availability of these LCHs at the point in time where the prioritization is performed);
  3>   if a MAC PDU to transmit has been obtained:
      4>   deliver the MAC PDU and the uplink grant and the HARQ information of the TB to the identified HARQ process;
      4>   instruct the identified HARQ process to trigger a new transmission;
      4>   if the uplink grant is addressed to CS-RNTI; or
      4>   if the uplink grant is a configured uplink grant; or
      4>   if the uplink grant is addressed to C-RNTI, and the identified HARQ process is configured for a configured uplink grant:
          5>     start or restart the configuredGrantTimer, if configured, for the corresponding HARQ process when the transmission is performed.
          5>     start or restart the configuredGrantTimer, if configured, for the corresponding HARQ process that has been prioritized over after performing MAC-based prioritization.
  3>   else:
      4>   flush the HARQ buffer of the identified HARQ process.
      4>   start or restart the configuredGrantTimer, if configured, for the corresponding HARQ process that has been prioritized over after performing MAC-based prioritization.

In some implementations, the MAC entity/HARQ entity of the UE may, upon reception of a DG for retransmission, check whether the PUSCH duration corresponding to the received DG conflicts with a PUSCH duration of an activated CG for new transmission, and check whether the configured grant timer for the HARQ process of the PUSCH duration, which corresponds to the CG, during the PUSCH duration corresponding to the CG (e.g., at the beginning of the PUSCH duration corresponding to the CG). That is, all configured grant timers corresponding to the HARQ processes of the conflicting PUSCH durations are started/restarted, regardless of which PUSCH duration is selected for transmission after intra-UE UL prioritization. Then, the status of the configured grant timer is synchronized between the UE side and the network side.

In some implementations, the MAC entity/HARQ entity may, for each PUSCH duration of an activated CG for new transmission, check whether this PUSCH duration conflicts with a PUSCH duration indicated by a DG, and check whether the configured grant timer for the HARQ process of the PUSCH duration that corresponds to the activated CG is not running. If both conditions are satisfied, the MAC entity/HARQ entity may start/restart the configured grant timer for the HARQ process of the DG during the PUSCH duration indicated by the DG (e.g., at the beginning of the PUSCH duration indicated by the DG) and start/restart the configured grant timer for the HARQ process of the PUSCH duration which corresponds to the CG during the PUSCH duration corresponding to the CG (e.g., at the beginning of the PUSCH duration corresponding to the CG). It is noted that a PUSCH duration indicated by a DG may be a PUSCH duration indicated by a DG for new transmission or a PUSCH duration indicated by a DG for retransmission. In some implementations, a DG for new transmission may be, but is not limited to, one of the following two options:

Option 1. If the DG was received on PDCCH for the C-RNTI and NDI, included in the associated HARQ information of the DG, is toggled compared to the value in the previous transmission of this TB of this HARQ process.

Option 2. If the DG was received on PDCCH for the C-RNTI and the HARQ buffer of the identified process is empty.

On the other hand, a DG for retransmission may be, but is not limited to, one of the following two options:

Option 1. If the DG was received on PDCCH for the C-RNTI and the NDI provided in the associated HARQ information of the DG is not toggled compared to the value in the previous transmission of this TB of this HARQ process.

Option 2. If the uplink grant is part of a bundle of the DG (e.g., the UE's current active BWP where the DG is received is configured with pusch-AggregationFactor. When the MAC entity is configured with pusch-AggregationFactor>1, the parameter pusch-AggregationFactor provides the number of transmissions of a TB within a bundle of the dynamic uplink grant. After the initial transmission, pusch-AggregationFactor−1 HARQ retransmissions follow within a bundle) and may not be used for initial transmission.

In some implementations, the MAC entity/HARQ entity of the UE may, for each PUSCH duration of an activated CG for retransmission, check whether this PUSCH duration conflicts with a PUSCH duration indicated by a DG for new transmission, and check whether the configured grant timer for the HARQ process of the PUSCH duration that corresponds to the activated CG is not running. If both conditions are satisfied, the MAC entity/HARQ entity may start/restart the configured grant timer for the HARQ process of the DG during the PUSCH duration indicated by the DG (e.g., at the beginning of the PUSCH duration indicated by the DG) and start/restart the configured grant timer for the HARQ process of the PUSCH duration which corresponds to the CG during the PUSCH duration corresponding to the CG (e.g., at the beginning of the PUSCH duration corresponding to the CG).

In some implementations, the MAC entity/HARQ entity of the UE may, for each PUSCH duration of an activated CG for new transmission, check whether this PUSCH duration conflicts with a PUSCH duration of an activated CG, and check whether the configured grant timer(s) for the HARQ process(es) of the PUSCH duration(s) of an activated CG(s) for new transmission is not running. If both conditions are satisfied, the MAC entity/HARQ entity may start/restart the configured grant timers for the HARQ processes of the conflicting PUSCH durations which correspond to the activated CGs during these conflicting PUSCH durations (e.g., at the beginning of these conflicting PUSCH durations). It is noted that a PUSCH duration of an activated CG may be a PUSCH duration of an activated CG for new transmission or a PUSCH duration of an activated CG for retransmission.

In some implementations, the MAC entity/HARQ entity of the UE may, for each PUSCH duration of an activated CG for retransmission, check whether this PUSCH duration conflicts with a PUSCH duration of an activated CG for new transmission, and check whether the configured grant timer for the HARQ process of the PUSCH duration corresponding to the activated CG for new transmission is not running. If both conditions are satisfied, the MAC entity/HARQ entity of the UE may start/restart the configured grant timers for the HARQ processes of the conflicting PUSCH durations which correspond to the activated CGs during these conflicting PUSCH durations (e.g., at the beginning of these conflicting PUSCH durations).

2. HARQ ID Conflict Between a DG and a CG

As mentioned earlier, a configured grant timer of a HARQ process may be started/restarted when a DG is received for CS-RNTI/C-RNTI for a (re-)transmission for this HARQ process regardless of whether the configured grant timer of this HARQ process is running when the DG is received. On the other hand, a configured grant timer of a HARQ process may be started/restarted upon actual PUSCH transmission of this HARQ process. Before the expiration of a configured grant timer for a HARQ process, new transmission on a PUSCH resource of an activated configured uplink grant for this HARQ process may be prohibited. However, this is under the 3GPP Rel-15 assumption that a PUSCH indicated by a DG may always have higher priority than a PUSCH duration of an activated CG. Such an assumption may become invalid in the 3GPP Release 16 (Rel-16) because the priority of a PUSCH indicated by a DG may no longer be necessarily higher than a PUSCH duration of an activated CG.

Thus, in some implementations, even if a HARQ process is occupied by a DG when a UE receives a PUSCH resource of an activated CG with this HARQ process (e.g. a configured grant timer for a HARQ process is started/restarted upon transmission on the PUSCH duration indicated by a DG of this HARQ process, and the configured grant timer for this HARQ process is still running when the UE receives a PUSCH resource of an activated CG with this HARQ process), a PUSCH duration of an activated CG with higher priority may still terminate and use this HARQ process for new transmission. This may be achieved by the mechanisms introduced in Approach 2.

Approach 2

Figure 5:
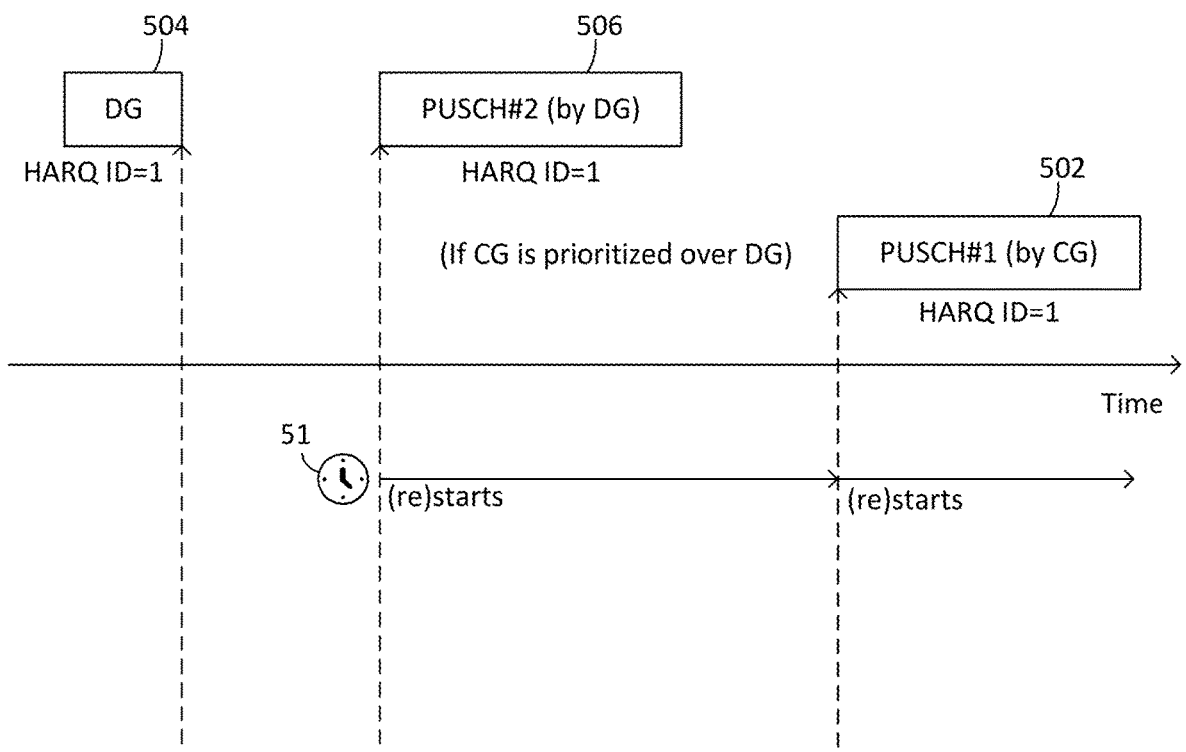
FIG. 5 is a schematic diagram illustrating the scenario of HARQ Identifier (ID) conflict where the HARQ process for the PUSCH duration of an activated CG is occupied by a DG with the same HARQ process, in accordance with an example implementation of the present application.

FIG. 5 is a schematic diagram illustrating the scenario of HARQ ID conflict where the HARQ process for the PUSCH duration of an activated CG is occupied by a DG with the same HARQ process (e.g., having the same HARQ ID), in accordance with an example implementation of the present application. In the implementation illustrated in FIG. 5, there is data available for transmission on PUSCH #1 duration 502 of an activated CG, and the HARQ process (e.g., with HARQ ID=1) for this PUSCH duration is occupied by DG 504. For example, the UE may start/restart configured grant timer 51 for the HARQ process (e.g., with HARQ ID=1) of DG 504 during PUSCH #2 duration 506, and data may become ready for transmission on PUSCH #1 duration 502 (which is directed to the same HARQ process as PUSCH #2 duration 506) while configured grant timer 51 is still running.

In some implementations, a prioritization rule (namely "HARQ process overriding rule") may be used to determine whether the transmission on the PUSCH duration of an activated CG (e.g., PUSCH #1 duration 502) may be allowed even if the corresponding HARQ process is still occupied (e.g., the configured grant timer for the corresponding HARQ process is still running) by a DG. The UE may perform the HARQ process overriding rule to compare the priority between the PUSCH duration of the activated CG (e.g., PUSCH #1 duration 502) and the priority of the PUSCH duration indicated by the DG (e.g., PUSCH #2 duration 506) that is occupying the HARQ process. If the PUSCH duration of an activated CG (e.g., PUSCH #1 duration 502) has a higher priority, this PUSCH duration may then be used for transmission (e.g., as the scenario shown in FIG. 5). Else, the PUSCH duration of the DG (e.g., PUSCH #2 duration 506) may continue occupying the HARQ process until the configured grant timer (e.g., configured grant timer 51) for the HARQ process of this DG expires.

In some implementations, the priority of the PUSCH duration of the activated CG and the priority of the DG may be determined by one of the following listed factors:

Factor 1: Based on the priority (the priority is configured by the gNB) of the highest-priority LCH with available data that satisfies the LCP mapping restrictions to the PUSCH durations corresponding to the DG and the CG. For example, the UE may prioritize a PUSCH duration corresponding to the highest priority LCH and with data available for transmission on this PUSCH.

Factor 2: Based on the priority (the priority is configured by the gNB) of the highest-priority LCH with available data that satisfies the LCP mapping restrictions to the PUSCH of the CG and the priority of the highest-priority LCH in the TB transmitted on the PUSCH duration indicated by the DG. For example, the UE may select/prioritize a PUSCH duration with the highest priority among priorities of the LCHs with data available that are multiplexed or can be multiplexed in the MAC PDUs/TBs associated to the PUSCH durations that are conflicting.

Factor 3: Based on the Modulation and Coding Scheme (MCS) of the PUSCH duration. For example, higher priority corresponds to higher/lower MCS index if the MCS tables for the DG and the CG are the same, or higher priority corresponds to the UL grant with the most reliable MCS table. For example, a UE may prioritize a PUSCH duration corresponding to the highest (or lowest) MCS index/most reliable MCS table among the conflicting PUSCH duration(s).

Factor 4: Based on the priority level of indicated by downlink control information (DCI), RRC signaling, lower layer or higher layer, etc. For example, a UE may prioritize a PUSCH duration that is indicated with the highest priority level (e.g., via DCI, RRC signaling, lower layer signaling, or higher layer signaling) among the conflicting PUSCH duration(s).

Figure 6:
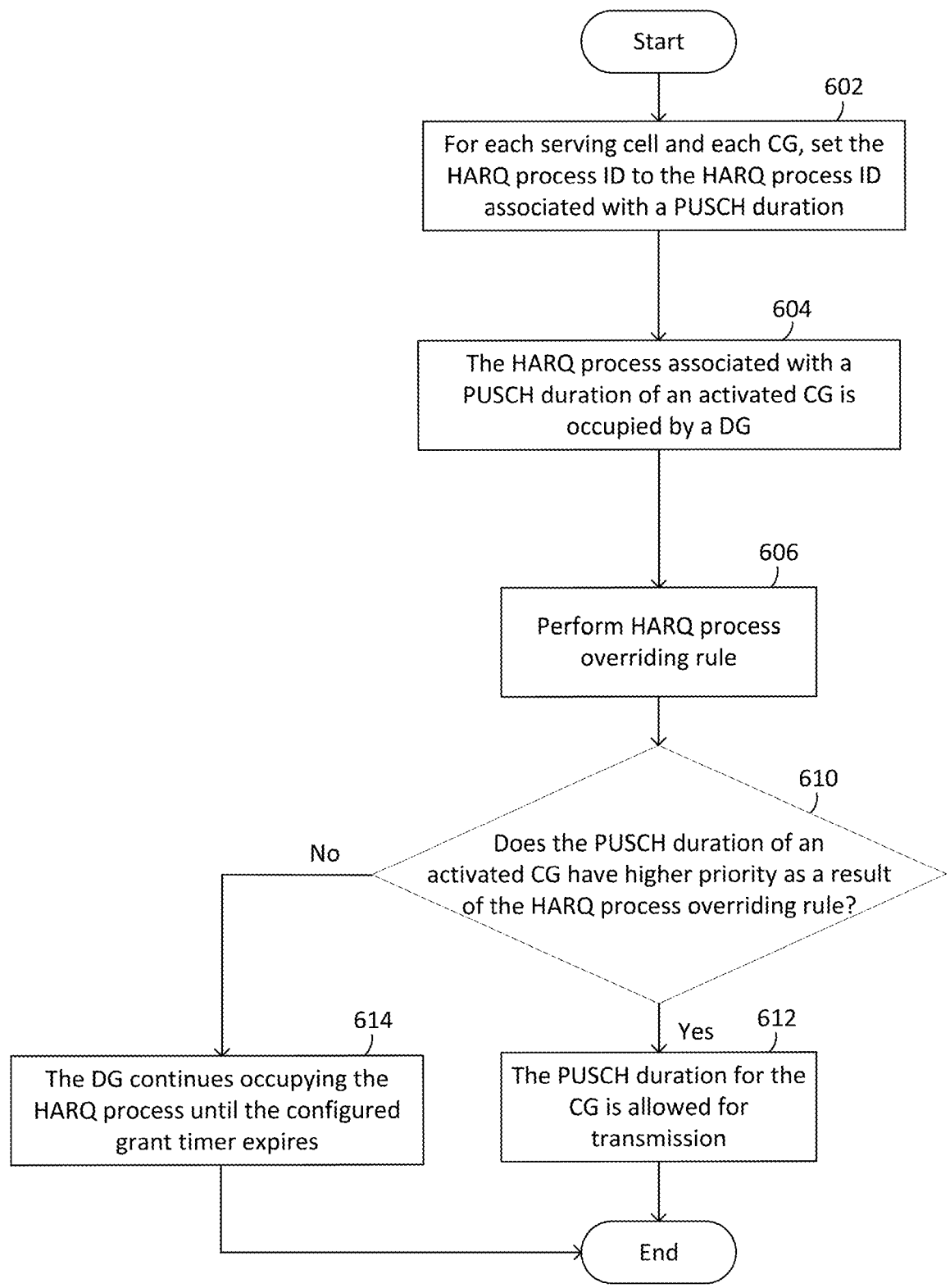
FIG. 6 is a flowchart of a method for operating a configured grant timer, in accordance with an example implementation of the present application.

FIG. 6 is a flowchart of a method for operating a configured grant timer, in accordance with an example implementation of the present application.

In action 602, for each serving cell and each CG (configured uplink grant), a UE may set a HARQ process ID (or HARQ ID) to a HARQ process ID that is associated with a PUSCH duration. For example, the HARQ process ID that is associated with a PUSCH duration may be derived from a predefined equation.

In action 604, the UE determines that the HARQ process associated with a PUSCH duration of activated CG is occupied by a DG. For example, the configured grant timer corresponding to the HARQ process of the PUSCH duration of the activated CG is still running when the PUSCH duration of the activated CG becomes available for transmission. Moreover, this configured grant timer was started or restarted when transmission of a resource indicated by the DG was performed.

In action 606, the UE may perform a HARQ process overriding procedure according to an overriding rule to compare the priority between the PUSCH duration of the CG and the PUSCH duration indicated by the DG.

In action 610, the UE may determine whether the PUSCH duration of an activated CG has a higher priority than the PUSCH duration indicated by the DG, as a result of the HARQ process overriding rule.

In action 612, if the PUSCH duration for the CG has a higher priority than the PUSCH duration indicated by the DG as a result of "HARQ process overriding rule," the UE may allow the PUSCH duration for the CG for transmission. Conversely, in action 614, if the PUSCH duration for the CG does not have a higher priority than the PUSCH duration indicated by the DG as a result of "HARQ process overriding procedure/rule," the UE may choose the PUSCH duration indicated by the DG for transmission. For example, the DG may continue occupying the HARQ process until the configured grant timer expires.

Figure 7:
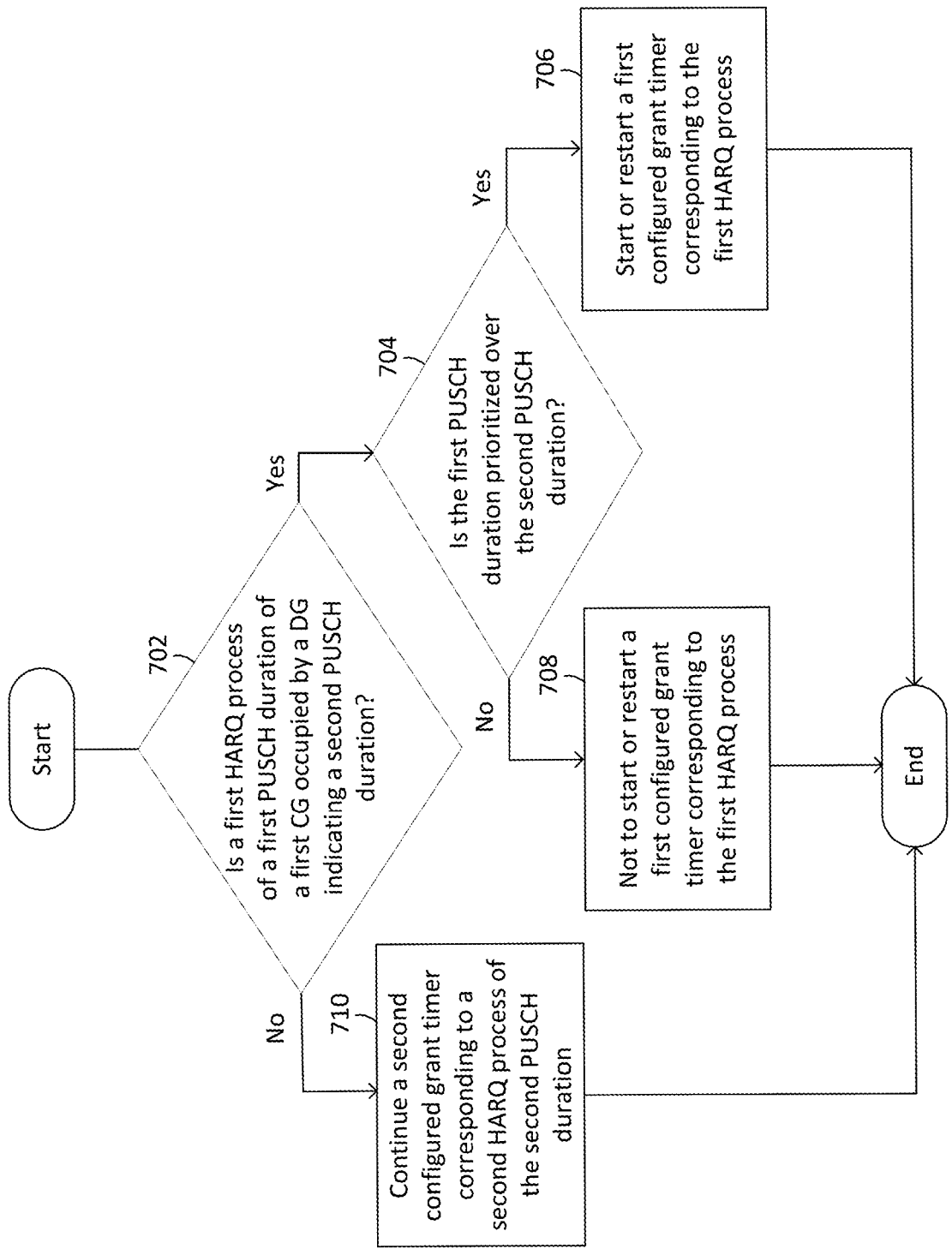
FIG. 7 is a flowchart of a method for operating a configured grant timer, in accordance with an example implementation of the present application.

FIG. 7 is a flowchart of a method for operating a configured grant timer, in accordance with an example implementation of the present application.

In action 702, a UE may determine whether a first HARQ process of a first PUSCH duration of a first activated CG (configured uplink grant) is occupied by a DG (dynamic uplink grant) indicating a second PUSCH duration. For example, the configured grant timer corresponding to the first HARQ process of the first PUSCH duration is still running when the first PUSCH duration becomes available for transmission. Moreover, this configured grant timer was started or restarted when transmission on the second PUSCH duration was performed.

Figure 8:
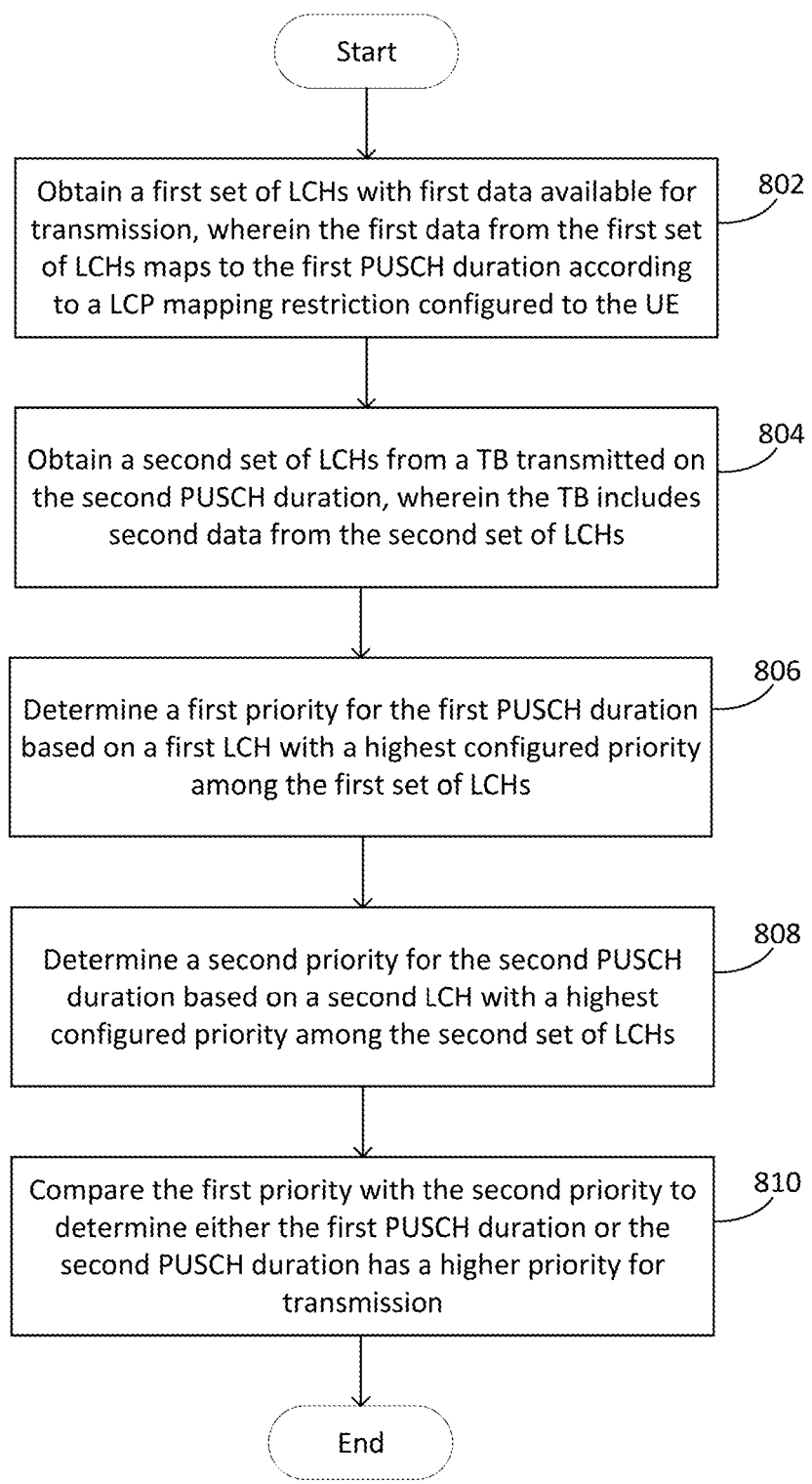
FIG. 8 is a flowchart of a procedure for determining the priorities for the first PUSCH duration and the second PUSCH duration, in accordance with an example implementation of the present application.

If the outcome of action 702 is Yes, in action 704, the UE may further determine whether the first PUSCH duration is prioritized over the second PUSCH duration. In some implementations, the UE may perform a procedure to determine the priorities for the first PUSCH duration and the second PUSCH duration. An example of the procedure is shown in FIG. 8. In some implementations, the priorities for the first PUSCH duration and the second PUSCH duration are determined based on Modulation and Coding Scheme (MCS) settings for the first PUSCH duration and the second PUSCH duration. In some implementations, the priorities for the first PUSCH duration and the second PUSCH duration are indicated by a base station through Downlink Control Information (DCI) or Radio Resource Control (RRC) signaling.

If the first PUSCH duration is prioritized over the second PUSCH duration, in action 706, the UE may start or restart a first configured grant timer corresponding to the first HARQ process during the first PUSCH duration. In some implementations, starting/restarting a CG timer (e.g., the first configured grant timer) during a PUSCH duration (e.g., the first PUSCH duration) may mean to start/restart the CG timer when transmission is performed on the PUSCH duration. For example, the UE may start/restart the first configured grant timer at/after the beginning of the first PUSCH duration.

If the second PUSCH duration is prioritized over the first PUSCH duration, in action 708, the UE may not start or restart a first configured grant timer corresponding to the first HARQ process during the first PUSCH duration.

If the outcome of action 702 is No, in action 710, the UE may continue a second configured grant timer corresponding to a second HARQ process of the second PUSCH duration (if this second configured grant timer is configured and still running).

In some implementations, the UE may start or restart the second configured grant timer corresponding to the second HARQ process of the second PUSCH duration during the second PUSCH duration. In a case that the UE is ready to perform a transmission on the first PUSCH duration while the second configured grant timer is running, and that the second HARQ process of the second PUSCH duration is the same as the first HARQ process of the first PUSCH duration, the UE may determine that the first HARQ process of the first PUSCH duration is occupied by the dynamic uplink grant indicating the second PUSCH duration in action 702.

FIG. 8 is a flowchart of a procedure for determining the priorities for the first PUSCH duration and the second PUSCH duration, in accordance with an example implementation of the present application.

In action 802, a UE may obtain a first set of LCHs with first data available for transmission. For example, the first data from the first set of LCHs may map to the first PUSCH duration according to an LCP mapping restriction configured to the UE.

In action 804, the UE may obtain a second set of LCHs from a TB transmitted on the second PUSCH duration, where the TB may include second data from the second set of LCHs.

In action 806, the UE may determine a first priority for the first PUSCH duration based on a first LCH with a highest configured priority among the first set of LCHs.

In action 808, the UE may determine a second priority for the second PUSCH duration based on a second LCH with a highest configured priority among the second set of LCHs.

In action 810, the UE may compare the first priority with the second priority to determine whether the first PUSCH duration or the second PUSCH duration has a higher priority for transmission. For example, the UE may prioritize the first PUSCH duration over the second PUSCH duration for transmission if the first priority is higher than the second priority.

Figure 9:
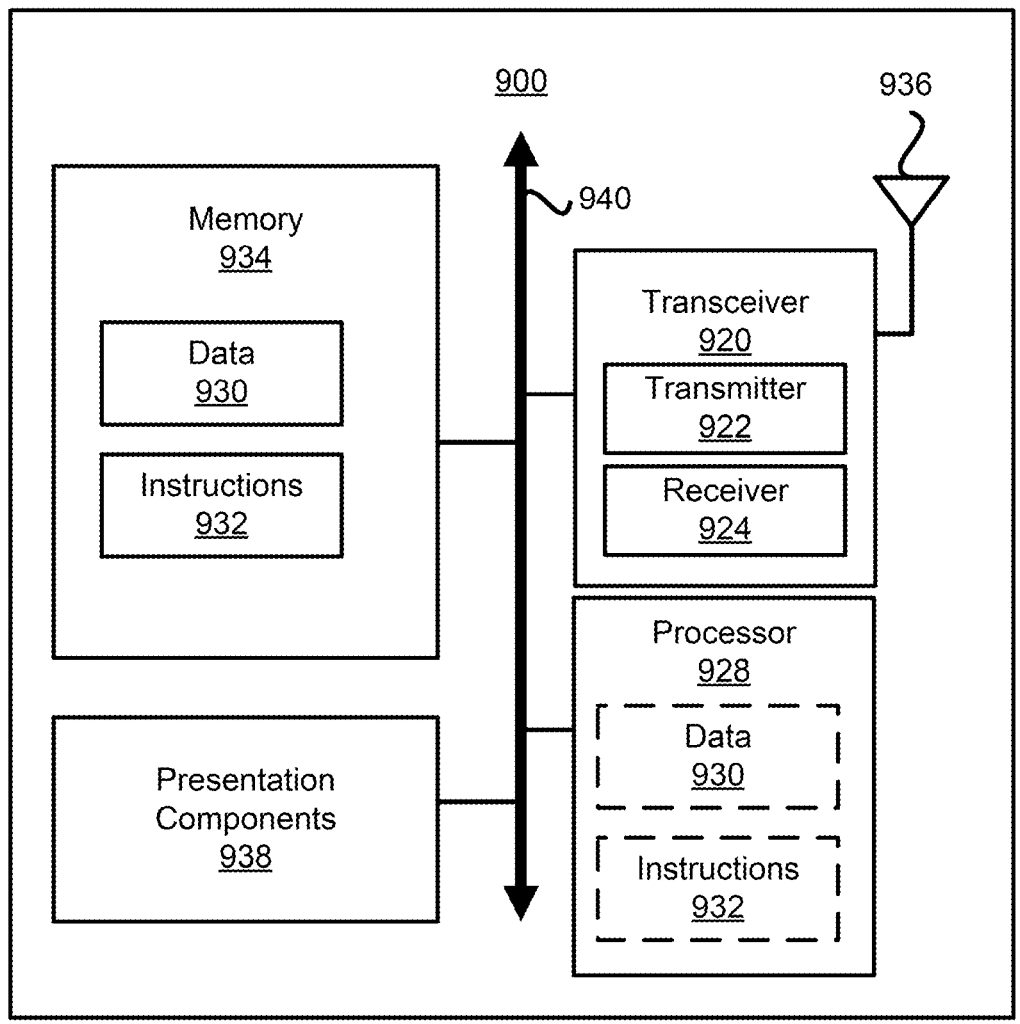
FIG. 9 is a block diagram illustrating a node for wireless communication, in accordance with various aspects of the present disclosure.

FIG. 9 is a block diagram illustrating a node for wireless communication, in accordance with various aspects of the present disclosure. As shown in FIG. 9, a node 900 may include a transceiver 920, a processor 928, a memory 934, one or more presentation components 938, and at least one antenna 936. The node 900 may also include a Radio Frequency (RF) spectrum band module, a BS communications module, a network communications module, and a system communications management module, Input/Output (I/O) ports, I/O components, and power supply (not explicitly shown in FIG. 9). Each of these components may be in communication with each other, directly or indirectly, over one or more buses 940. In one implementation, the node 900 may be a UE, a BS, or any other apparatus of wireless communications that performs various functions described herein, for example, with reference to FIGS. 1 through 8.

The transceiver 920 having a transmitter 922 (e.g., transmitting/transmission circuitry) and a receiver 924 (e.g., receiving/reception circuitry) may be configured to transmit and/or receive time and/or frequency resource partitioning information. In some implementations, the transceiver 920 may be configured to transmit in different types of subframes and slots including, but are not limited to, usable, non-usable and flexibly usable subframes and slot formats. The transceiver 920 may be configured to receive data and control channels.

The node 900 may include a variety of computer-readable media. Computer-readable media may be any available media that may be accessed by the node 900 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 934 may include computer-storage media in the form of volatile and/or non-volatile memory. The memory 934 may be removable, non-removable, or a combination thereof. Examples of memory includes solid-state memory, hard drives, optical-disc drives, etc. As illustrated in FIG. 9, the memory 934 may store computer-readable, computer-executable instructions 932 (e.g., software codes) that are configured to, when executed, cause the processor 928 to perform various functions described herein, for example, with reference to FIGS. 1 through 8. Alternatively, the instructions 932 may not be directly executable by the processor 928 but be configured to cause the node 900 (e.g., when compiled and executed) to perform various functions described herein.

The processor 928 (e.g., having processing circuitry) may include a Central Processing Unit (CPU), a microcontroller, an ASIC, an intelligent hardware device, or any combination thereof configured to perform the functions described herein. The processor 928 may include memory. The processor 928 may process the data 930 and the instructions 932 received from the memory 934, and information through the transceiver 920, the base band communications module, and/or the network communications module. The processor 928 may also process information to be sent to the transceiver 920 for transmission through the antenna 936, to the network communications module for transmission to a core network.

One or more presentation components 938 may present data indications to a person or other devices. Examples of presentation components 938 may include a display device, speaker, printing component, vibrating component, etc.

From the above description, it is disclosed that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE), comprising:
   at least one processor; and
   at least one non-transitory computer-readable medium coupled to the at least one processor and storing one or more computer-executable instructions that, when executed by the at least one processor, cause the UE to:
   determine whether a first Hybrid Automatic Repeat Request (HARQ) process of a first Physical Uplink Shared Channel (PUSCH) duration of a first configured uplink grant is occupied by a dynamic uplink grant indicating a second PUSCH duration; and
   in response to determining that the first HARQ process of the first PUSCH duration is occupied by the dynamic uplink grant indicating the second PUSCH duration:
   determine whether the first PUSCH duration is prioritized over the second PUSCH duration based on a set of rules for determining priorities for the first PUSCH duration and the second PUSCH duration, and
   in response to determining that the first PUSCH duration is prioritized over the second PUSCH duration, perform a transmission on the first PUSCH duration, and start or restart a first configured grant timer corresponding to the first HARQ process of the first PUSCH duration during the first PUSCH duration.

2. The UE of claim 1, wherein the one or more computer-executable instructions, when executed by the at least one processor, further cause the UE to:
   start or restart a second configured grant timer corresponding to a second HARQ process of the second PUSCH duration during the second PUSCH duration; and
   in response to determining that the UE is ready to perform the transmission on the first PUSCH duration while the second configured grant timer is running, and that the second HARQ process of the second PUSCH duration is the same as the first HARQ process of the first PUSCH duration, determine that the first HARQ process of the first PUSCH duration is occupied by the dynamic uplink grant indicating the second PUSCH duration.

3. The UE of claim 1, wherein determining the priorities for the first PUSCH duration and the second PUSCH duration comprises:
   obtaining a first set of Logical Channels (LCHs) with first data available for transmission, wherein the first data from the first set of LCHs maps to the first PUSCH duration according to a Logical Channel Prioritization (LCP) mapping restriction configured to the UE;
   obtaining a second set of LCHs from a Transport Block (TB) transmitted on the second PUSCH duration, wherein the TB includes second data from the second set of LCHs;
   determining a first priority for the first PUSCH duration based on a first LCH with a highest configured priority among the first set of LCHs; and
   determining a second priority for the second PUSCH duration based on a second LCH with a highest configured priority among the second set of LCHs.

4. The UE of claim 1, determining the priorities for the first PUSCH duration and the second PUSCH duration comprises determining the priorities for the first PUSCH duration and the second PUSCH duration based on Modulation and Coding Scheme (MCS) settings for the first PUSCH duration and the second PUSCH duration.

5. The UE of claim 1, wherein the priorities for the first PUSCH duration and the second PUSCH duration are indicated by a base station through Downlink Control Information (DCI) or Radio Resource Control (RRC) signaling.

6. The UE of claim 1, wherein the one or more computer-executable instructions, when executed by the at least one processor, further cause the UE to:
   determine whether the first PUSCH duration overlaps the second PUSCH duration in time domain; and
   in response to determining that the first PUSCH duration overlaps the second PUSCH duration in the time domain, start or restart the first configured grant timer during the first PUSCH duration and start or restart a second configured grant timer during the second PUSCH duration.

7. The UE of claim 1, wherein the one or more computer-executable instructions, when executed by the at least one processor, further cause the UE to:
   determine whether the second PUSCH duration overlaps a third PUSCH duration of a second configured grant in time domain; and
   in response to determining that the second PUSCH duration overlaps the third PUSCH duration of the second configured grant in the time domain,
   start or restart a second configured grant timer during the second PUSCH duration, and
   start or restart a third configured grant timer corresponding to a third HARQ process of the third PUSCH duration during the third PUSCH duration.

8. A method performed by a User Equipment (UE) for wireless communications, the method comprising:
   determining whether a first Hybrid Automatic Repeat Request (HARQ) process of a first Physical Uplink Shared Channel (PUSCH) duration of a first configured uplink grant is occupied by a dynamic uplink grant indicating a second PUSCH duration; and
   in response to determining that the first HARQ process of the first PUSCH duration is occupied by the dynamic uplink grant indicating the second PUSCH duration:
   determining whether the first PUSCH duration is prioritized over the second PUSCH duration based on a set of rules for determining priorities for the first PUSCH duration and the second PUSCH duration, and
   in response to determining that the first PUSCH duration is prioritized over the second PUSCH duration, performing a transmission on the first PUSCH duration, and starting or restarting a first configured grant timer corresponding to the first HARQ process of the first PUSCH duration during the first PUSCH duration.

9. The method of claim 8, further comprising:
starting or restarting a second configured grant timer corresponding to a second HARQ process of the second PUSCH duration during the second PUSCH duration; and in response to determining that the UE is ready to perform the transmission on the first PUSCH duration while the second configured grant timer is running, and that the second HARQ process of the second PUSCH duration is the same as the first HARQ process of the first PUSCH duration, determining that the first HARQ process of the first PUSCH duration is occupied by the dynamic uplink grant indicating the second PUSCH duration.

10. The method of claim 8, wherein determining the priorities for the first PUSCH duration and the second PUSCH duration comprises:
obtaining a first set of Logical Channels (LCHs) with first data available for transmission, wherein the first data from the first set of LCHs maps to the first PUSCH duration according to a Logical Channel Prioritization (LCP) mapping restriction configured to the UE;
obtaining a second set of LCHs from a Transport Block (TB) transmitted on the second PUSCH duration, wherein the TB includes second data from the second set of LCHs;
determining a first priority for the first PUSCH duration based on a first LCH with a highest configured priority among the first set of LCHs; and
determining a second priority for the second PUSCH duration based on a second LCH with a highest configured priority among the second set of LCHs.

11. The method of claim 8, wherein determining the priorities for the first PUSCH duration and the second PUSCH duration comprises determining the priorities for the first PUSCH duration and the second PUSCH duration based on Modulation and Coding Scheme (MCS) settings for the first PUSCH duration and the second PUSCH duration.

12. The method of claim 8, wherein the priorities for the first PUSCH duration and the second PUSCH duration are indicated by a base station through Downlink Control Information (DCI) or Radio Resource Control (RRC) signaling.

13. The method of claim 8, further comprising:
determining whether the first PUSCH duration overlaps the second PUSCH duration in time domain; and
in response to determining that the first PUSCH duration overlaps the second PUSCH duration in the time domain, starting or restarting the first configured grant timer during the first PUSCH duration and starting or restarting a second configured grant timer during the second PUSCH duration.

14. The method of claim 8, further comprising:
determining whether the second PUSCH duration overlaps a third PUSCH duration of a second configured grant in time domain; and
in response to determining that the second PUSCH duration overlaps the third PUSCH duration of the second configured grant in the time domain,
starting or restarting, by the UE, a second configured grant timer during the second PUSCH duration, and
starting or restarting a third configured grant timer corresponding to a third HARQ process of the third PUSCH duration during the third PUSCH duration.

* * * * *